United States Patent Office 3,358,035
Patented Dec. 12, 1967

3,358,035
1-CHLORO-2-(3-NITRO-4-CHLOROPHENYL-SULFONYL)ETHYLENE
Giuseppe Losco, Milan, Italy, assignor to Montecatini Edison S.p.A., Milan, Italy
No Drawing. Filed Feb. 28, 1963, Ser. No. 261,819
Claims priority, application Italy, Mar. 5, 1962, 4,249/62
1 Claim. (Cl. 260—607)

The present invention relates to a new class of ethyl sulfonic compounds which exhibit both anticryptogamic activity and a low toxicity towards warm-blooded animals.

The compounds of the invention have the Formula 1:

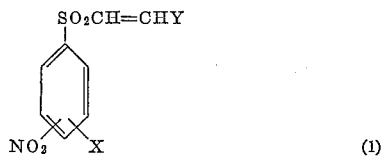

(1)

in which X is selected from the group consisting of hydrogen, chlorine and —NO₂ group, and Y is a halogen atom.

I have found that compounds having the Formula 1 are active against fungi and spores without impairing, at the same time, the parts of the plant with which they are contacted.

Among the compounds having the Formula 1, 1-chloro-2-p. nitrophenyl-sulfonyl-ethylene is particularly active. Other preferred compounds are 1-chloro-2-(2,4-dinitrophenyl-sulfonyl) - ethylene, 1 - chloro-2-(3-nitro-4-chlorophenyl-sulfonyl) - ethylene, 1 - chloro-2-(3-nitrophenyl-sulfonyl)-ethylene.

The compounds of the invention can be used in the conventional form of aqueous emulsions or suspensions or powders. The emulsions are prepared by known methods, by dissolving the active substances in suitable solvents in the presence of emulsifiers. Wettable powders (employable for suspensions in water) are obtained by grinding the active substances until the required fineness is reached, adding inert fillers such as kaolin, talc and bentonite and a suitable dispersing agent. Dusting powders are prepared by grinding the active substances with the addition of inert fillers of the aforementioned type.

In the compositions provided by the present invention, in addition to these auxiliary substances, there can be used also other substances having pesticidal or other activity.

One type of liquid formulation can be prepared by mixing the active substance with a suitable solvent, e.g. dioxane, a non-ionic surface active agent such as the condensation products of ethylene oxide with an alkyl phenol, and an anionic surface-active agent such as an alkylarylsulfonate or an alkylsulfate.

The fungicidal activity of the compounds having the Formula 1 is in some cases particularly high. Thus, for instance, 1-chloro - 2 - p.nitrophenyl-sulfonyl-ethylene presents an activity against downygrape mildew (*Plasmopara viticola*) about twice, and against the spores of *Alternaria tenuis* more than four times that of zinc ethylene bisdithiocarbamate ("Zineb"), which is one of the best known anticryptogamic compounds.

A very favorable characteristic of the compounds of the invention is their low toxicity towards warm-blooded animals. For instance, 1000 mmg./kg. of 1-chloro-2-p. nitrophenyl-sulfonyl-ethylene give a mortality of 0% per os on mice; 200 mmg./kg. of 1-chloro-2-p.nitrophenyl-sulfonyl-ethylene give a mortality of 0% by intravenous application on mice.

The compounds of my invention can be prepared by conventional methods (see Gazzetta Chimica Italiana, 86, 1956, page 413). Thus, for example, 1-chloro-2-p.nitrophenyl-sulfonyl-ethylene is obtainable from 1-chloro-2-p.nitrophenyl-mercaptoethylene by oxidation with hydrogen peroxide in the presence of glacial acetic acid as follows:

Into a 1-liter flask provided with an agitator, thermometer, reflux condenser and dropping funnel, are introduced 65 g. of 1-chloro-2-p.nitrophenyl-mercaptoethylene and 170 cc. of glacial acetic acid. The reaction mixture is heated to 70–75° C., until complete dissolution. While agitating, a mixture of:

75 cc. 30–33% hydrogen peroxide
175 cc. glacial acetic acid
5 cc. concentrated sulfuric acid is introduced within 20 minutes. During the introduction of the latter substances, the temperature of the reaction mixture rises up to 95–100° C. At the end of the addition, the mixture is left to cool. The reaction product is separated in a bulky crystalline form after cooling to 10° C., filtrating and washing with water to neutrality. 64 g. of a straw-yellow product having a melting point of 155–157° C. are obtained. The analysis shows: S calculated=12.95%; S found=12.88–12.94%.

The product obtained is soluble in acetone, benzene, dioxane and dimethylacetamide, is scarcely soluble in ethanol and is insoluble in H₂O.

1-chloro-2-(2,4-dinitrophenylsulfonyl) ethylene can be prepared by the method described in J.A.C.S. 77, page 3390.

1-chloro-2-(3-nitro-4-chlorophenyl-sulfonyl) ethylene is obtainable by nitration of 4-chloro-phenylsulfonyl-2-chloro-ethylene.

The following examples are given to illustrate the activity of some of the compounds of the invention and also the method of preparing them, without limiting the scope of the invention.

*Example 1*

10 parts by weight of 1-chloro-p.nitrophenyl-sulfonyl-ethylene are introduced into a mixer, together with 83 parts by weight of dioxane, 4 parts by weight of a non-ionic surface active agent, consisting of the condensation product of ethylene oxide with an alkyl phenol, and 3 parts by weight of an anionic surface active agent, consisting of calcium dodecylbenzene sulfonate. The mixture is agitated at room temperature until it becomes homogeneous. A water-emulsifiable solution is thus obtained.

*Example 2*

23.7 g. of 4-chloro-phenyl-sulfonyl-2-chloroethylene are dissolved in 51 cc. of concentrated H₂SO₄. While vigorously agitating at 5–10° C., a mixture consisting of 7.5 g. of 98.5% —HNO₃ (fuming) and 15 g. of concentrated H₂SO₄ is added dropwise within 5 minutes. At the end of the addition, the whole is further agitated at 5–10° C. for 10 minutes and is then heated to about 25° C. and left to stand for one hour. The mixture is then poured into 700 g. of an ice-water mixture, and the product is filtered and washed with water to neutrality. 31.5 g. of 1-chloro-2-(3-nitro-4-chlorophenylsulfonyl)-ethylene (colorless amorphous solid) having a melting point of 106–109° C. are obtained. A sample crystallized from methanol has a melting point of 109–110° C.

Cl calculated=25.13%; N=4.96%. Cl found=25.25–25.27%; N=5.12%.

the four test fungi. After incubation in a thermostat at 25° C. for 72 hours, the inhibition halos of fungi growth on the agar-agar surface (distance in mm. between the outer edge of the cup and the point where the test fungus begins to grow) are determined.

The results of the evaluations of the products under examination (expressed in mm.) are reported in the following table:

| Product | a.s. conc., percent | Inhibition haloes (millimeters) | | | |
|---|---|---|---|---|---|
| | | Alternaria tenuis N. | Aspergillus niger T. | Penicillium roqueforti T. | Saccaromyces ellipsoideus H. |
| Sodium pentachlorophenate (Santobrite) | 1 | 23 | 21 | 21 | 11 |
| | 0.2 | 17 | 11 | 14 | 4 |
| | 0.04 | 9 | 6 | 7 | 4 |
| 1-chloro-2-p.nitrophenylsulfonyl-ethylene | 1 | 28 | 14 | 15 | 12 |
| | 0.2 | 24 | 12 | 14 | 10 |
| | 0.04 | 15 | 6 | 7 | 9 |
| 1-chloro-2-(2,4-dinitrophenylsulfonyl)-ethylene | 1 | 28 | 13 | 18 | 11 |
| 1-chloro-2-(3-nitro-4-chlorophenylsulfonyl)-ethylene | 1 | 32 | 12 | 16 | 11 |
| 1-chloro-2-(3-nitrophenylsulfonyl)-ethylene | 1 | 29 | 16 | 22 | 11 |

*Example 3.—Paper-disc method*

Three small filter-paper discs of 1 cm. diameter are impregnated with solutions of the products to be examined (0.05 cc.), having known active product contents, and left to dry. These small discs are then placed on the surface of Petri dishes of 10 cm. diameter, which were previously coated with agar-agar seeded with the four test fungi. After incubation in a thermostat at 25° C. for 72 hours, the inhibition haloes of fungi growth around these discs are determined by measuring on the agar-agar surface the distance (expressed in mm.) between the disc edge and the point at which the test fungus begins to grow.

(B) *Streak method.*—The solution of the product is incorporated in the nutritive medium while the inoculation of the text fungi is carried out by means of streaks with spore suspension.

The reading of the plates is made after 72 hours by evaluating the growth of the fungi according to the following scale:

0=no difference compared with the control water
1=slight difference compared with the control water
2=colonies spread in all the streak
3=some colonies in only one point of the streak
4=no fungi growth The results are reported in the following table:

| Product | a.s. conc., percent | Alternaria tenuis N. | Aspergillus niger T. | Penicillium roqueforti T. | Saccaromyces ellipsoideus H. |
|---|---|---|---|---|---|
| Sodium pentachlorophenate (Santobrite) | 0.02 | 4 | 4 | 4 | 4 |
| | 0.004 | 4 | 4 | 4 | 4 |
| | 0.0008 | 2 | 2 | 2 | 1 |
| 1-chloro-2-p.nitrophenylsulfonyl-ethylene | 0.02 | 4 | 4 | 4 | 4 |
| | 0.004 | 4 | 4 | 3 | 2 |
| | 0.0008 | 4 | 3 | 2 | 1 |
| 1-chloro-2-(2,4-dinitrophenylsulfonyl)-ethylene | 0.02 | 4 | 3 | 3 | 0 |
| 1-chloro-2-(3-nitro-4-chlorophenylsulfonyl)-ethylene | 0.02 | 4 | 4 | 4 | 4 |
| 1-chloro-2-(3-nitrophenylsulfonyl)-ethylene | 0.02 | 4 | 4 | 4 | 4 |

The results obtained are reported in the following table:

| Products | a.s. conc., percent | Inhibition haloes (millimeters) | | | |
|---|---|---|---|---|---|
| | | Alternaria tenuis N. | Aspergillus niger T. | Penicillium roqueforti T. | Saccaromyces ellipsoideus H. |
| Sodium pentachlorophenate (Santobrite) | 1 | 21 | 18 | 19 | 9 |
| | 0.2 | 11 | 7 | 11 | 4 |
| | 0.04 | 4 | 4 | 4 | 2 |
| 1-chloro-2-p-nitrophenylsulfonylethylene | 1 | 18 | 4 | 6 | 2 |
| | 0.2 | 16 | 3 | 5 | 2 |
| | 0.04 | 15 | 3 | 4 | 1 |
| 1-chloro-2-(2,4-dinitrophenylsulfonyl)-ethylene | 1 | 20 | 6 | 12 | 5 |
| 1-chloro-2-(3-nitro-4-chlorophenylsulfonyl)-ethylene | 1 | 23 | 3 | 6 | 2 |
| 1-chloro-2-(3-nitrophenylsulfonyl)-ethylene | 1 | 22 | 7 | 12 | 4 |

*Example 4*

(A) *Cup method.*—Three porcelain cups, "fish spine beads," each containing 0.025 cc. of a solution with a known content of the product to be examined, are placed on the surface of Petri dishes with a diameter of 10 cm., which were previously coated with agar-agar seeded with

*Example 5.—Tests on spores of* Alternaria tenuis *(slide-germination method)*

Suspension of product prepared with doses in geometrical progression (ratio 1:2) and with added spores of *Alternaria tenuis* taken from 3-day-old cultures are placed as drops on slides. After about 20 hours, the inhibition of the sport germination is determined by reading on the microscope.

In the following table is reported the average of three repetitions for each dose.

| Test dose a.s., Percent | Percentage of germinated spores, corrected on the basis of mortality of the control water and of the length of the tube of the germinated spores (average capacity of germination of untreated controls: 97%) | | | | |
|---|---|---|---|---|---|
| | Zinc ethylene-bisdithio-carbamate | 1-chloro-2-p-nitro-phenyl-sulfonyl-ethylene | 1-chloro-2-(2,4-dinitro-phenyl-sulfonyl)-ethylene | 1-chloro-2-(3-nitro-4-chloro-phenyl-sulfonyl)-ethylene | 1-chloro-2-(3-nitrophenyl-sulfonyl)-ethylene |
| 0.0250 | 0 | 0 | | | |
| 0.0125 | 9 | 0 | 0 | | |
| 0.0062 | 27 | 0 | 1 | | |
| 0.0031 | 43 | 4 | 7 | | 0 |
| 0.0016 | 70 | 11 | 32 | 0 | 2 |
| 0.0008 | 85 | 58 | 80 | 1 | 18 |
| 0.0004 | | | 100 | 8 | 33 |
| 0.0002 | | | | 12 | 47 |
| 0.0001 | | | | 16 | |

*Example 6.—Tests on Uromyces appendiculatus (bean rust)*

Both primary leaves of young French bean plants are treated with aqueous suspensions of the products to be tested and, after drying the deposit, infected with *Uromyces appendiculatus* spores. After 15 days the pustules appearing on each leaf are counted.

In the following table is reported the average of two repetitions with three plants per dose in each test.

| Test dose, percent of a.s. | Percent infection compared with that of the untreated control (average infection of untreated controls: about 900 pustules per leaf) | |
|---|---|---|
| | Zinc ethylene-bis-di-thiocarbamate | 1-chloro-2-p.nitrophenyl-sulfonyl-ethylene |
| 0.0100 | 23 | 16 |
| 0.0025 | 87 | 80 |

*Example 7.—Activity test on downygrape mildew (Plasmopara viticola)*

Vine leaves grown in pots under artificial light are removed and preserved on the bottom of Petri dishes, adapted to act as wet rooms by means of a filter paper sheet kept wet by a small piece of synthetic sponge impregnated with water. The leaves, placed with the lower page turned upwards, are treated with aqueous suspensions of the products to be seeded, and when the deposit is dried, are infected with mildew *conidia*. After 12 days the results are read by counting the number of mildew infections on each leaf.

In the following table is reported the average of two repetitions, with 5 leaves per dose in each test.

| Test dose, percent of a.s. | Percent infection compared with that of the untreated control (average infection of untreated control: about 160 spots per leaf) | | | |
|---|---|---|---|---|
| | Zinc ethylene bis dithio-carbamate | 1-chloro-2-p.nitro-phenyl-sulfonyl-ethylene | 1-chloro-2-(2,4-dinitrophenyl-sulfonyl)-ethylene | 1-chloro-2-(3-nitro-4-chloro-phenylsulfonyl)-ethylene |
| 0.0032 | 3 | 0 | | |
| 0.0016 | 21 | 3 | 0 | 0 |
| 0.0008 | 52 | 21 | 0 | 0 |
| 0.0004 | 75 | 49 | 3 | 0 |
| 0.0002 | | | 8 | 9 |
| 0.0001 | | | 32 | 14 |
| | | | 50 | 22 |

*Example 8.—Activity test on Botrytis fabae*

Broad bean leaves, grown on sand under artificial light, are removed and preserved on the bottom of Petri dishes, adapted to act as a wet room by means of a filter paper sheet kept wet by a small piece of synthetic sponge impregnated with water.

The leaves, placed with the lower page turned upwards, are treated with aqueous suspensions of the product to be examined and, when the deposit is dried, are infected with *Botrytis conidia*. After 6 days the results are read by counting the infection spots on each leaf.

In the following table is reported the average of two repetitions with 10 leaves per dose in each test.

| Test dose, percent of a.s. | Percent infection compared with that of the untreated control (average infection of the untreated control: about 100 spots per leaf) | | |
|---|---|---|---|
| | 1-chloro-2-p-nitrophenyl-sulfonyl-ethylene | 1-chloro-2-(2,4-dinitrophenyl-sulfonyl)-ethylene | 1-chloro-2-(3-nitro-4-chloro-phenylsulfonyl)-ethylene |
| 0.01 | | 26 | 21 |
| 0.00500 | 8 | | |
| 0.00125 | 33 | | |
| 0.00031 | 61 | | |

I claim:

1-chloro - 2 - (3 - nitro - 4 - chlorophenyl - sulfonyl) ethylene.

(References on following page)

References Cited

UNITED STATES PATENTS

| | | | |
|---|---|---|---|
| 2,921,965 | 1/1960 | Dazzi | 260—607 |
| 2,954,319 | 9/1960 | Uhlenbrock et al. | 167—30 |
| 3,038,944 | 6/1962 | Louthan | 260—207 |
| 3,065,129 | 11/1962 | Miller | 167—30 |

OTHER REFERENCES

Kharasch et al., J. Am. Chem. Soc., vol. 77, p. 3390 (1955).

Leandri et al., Chem. Abstracts, vol. 50, p. 222 (1956).

JOSEPH P. BRUST, *Primary Examiner.*

D. D. HORWITZ, *Examiner.*

D. R. PHILLIPS, *Assistant Examiner.*